United States Patent [19]

McConnell et al.

[11] 4,283,915
[45] Aug. 18, 1981

[54] HYDRAULIC FLUID GENERATOR

[75] Inventors: David P. McConnell, P.O. Box 591, Minden, Nev. 89423; Louis E. Tully, LaCanada, Calif.

[73] Assignee: David P. McConnell, Fallon, Nev.

[21] Appl. No.: 677,041

[22] Filed: Apr. 14, 1976

[51] Int. Cl.³ .............................................. F03G 7/06
[52] U.S. Cl. ....................................... 60/650; 60/530
[58] Field of Search ........................ 60/530, 650, 682

[56] References Cited

U.S. PATENT DOCUMENTS

| | | | |
|---|---|---|---|
| 3,055,170 | 9/1962 | Westcott, Jr. | 60/682 X |
| 3,425,485 | 2/1969 | Newton | 165/27 X |
| 3,753,462 | 8/1973 | Burger | 165/27 X |
| 4,107,928 | 8/1978 | Kelly et al | 60/530 X |

OTHER PUBLICATIONS

Literary Digest, Aug. 15, 1931, p. 28.

*Primary Examiner*—Allen M. Ostrager
*Attorney, Agent, or Firm*—Paul A. Weilein

[57] ABSTRACT

Two sources of water with a temperature differential of say 20° F. flow alternately through heat exchanger tubes to expand and contract a working liquid that has a high coefficient of thermal expansion, the whole working cycle being carried out below the boiling point of the working liquid. With check valves preventing reverse flow, the expansion and contraction of the working liquid provides a high pressure hydraulic output which may be used to drive a hydraulic motor. To provide substantially steady output flow, four banks of heat exchangers may be operated sequentially with hydraulic accumulator means smoothing out the flow pulsations. Each bank has a four-stage operating cycle and electrical circuitry controls the four banks simultaneously to cause the four different stages to occur in certain of the four different banks in staggered relation for producing a substantially constant overall hydraulic output.

34 Claims, 5 Drawing Figures

HYDRAULIC FLUID GENERATOR

BACKGROUND OF THE INVENTION

This invention relates to a system and method for deriving energy from a source of relatively warm water, which source, for example, may be a geothermal source. Successful systems have been devised for deriving power from geothermal steam, but potential sources of relatively warm water at temperatures below the boiling point of water are by far more numerous than potential sources of geothermal steam. Such sources of warm water are especially inviting because it is not necessary to deal with hazardous high gaseous fluid pressures. The problem is to provide commercially practical means for utilizing warm water as an energy source.

SUMMARY OF THE INVENTION

A primary object of the invention is to convert the heat energy of warm water into high pressure hydraulic output flow to be utilized, for example, to drive a hydraulic motor. The basic concept of the invention is to provide a working liquid having a relatively high coefficient of thermal expansion and to subject the working liquid to alternate heating and cooling at values below its boiling point. For such purpose, water from a hot water source is employed as a heat exchange liquid for heating the working liquid, and while any suitable means may be employed as a heat exchange liquid for cooling the working liquid, it is convenient to employ a second source of relatively cool water for this purpose. Theoretically, the temperature difference between the two water sources may be well under 10° F., but a higher temperature difference is desirable. A temperature differential of 20° F. has been used with outstanding success.

The two sources of relatively warm and relatively cool heat exchange water, respectively, may comprise two wells. Two suitable sources may also be found at different depths in the ocean.

A further object of the invention is to provide an apparatus for carrying out the basic concept. In the presently preferred practice of the invention, heat exchange means for this purpose provides a heat exchange zone and a confined passage through the heat exchange zone for the working liquid, the confined passage having an intake end and an output end. The heat exchange means also provides space for flow of the relatively warm and relatively cool heat exchange water through the heat exchange zone to provide for alternate heating and cooling of the working liquid in the confined passage. With check valve means preventing reverse flow of the working liquid in the confined passage through the heating zone, the alternate expansion and contraction of the working liquid results in periodic high pressure hydraulic discharge surges from the output end of the confined passage, which may be used, for example, to actuate a suitable hydraulic motor.

In the presently preferred practice of the invention, the working liquid circulates in a closed path from the output end of the confined passage of the heat exchange means to the inlet of a hydraulic motor and from the outlet of the motor back to the intake end of the confined passage. Suitable means, such as surge tanks and/or hydraulic accumulators, may be employed to smooth out pressure surges in the working liquid output.

The invention further includes the concept of employing a plurality of heat exchange means with sequential heating and cooling of the working liquid for power production on a useful scale. Each heat exchange means is disclosed as comprising a bank of parallel connected heat exchangers provided with four normally closed control valves, namely, a first valve to control the entry of cold heat exchange water; a second valve to control the egress of the cold heat exchange water; a third valve to control the entrance of the relatively hot heat exchange water; and a fourth valve to control the egress of the relatively hot heat exchange water. Suitable electric control operates the four valves in each bank of heat exchangers to provide a four-stage operating cycle, the operating cycles of the four banks occurring in sequence so as to provide a substantially constant overall hydraulic output.

The first stage of the operating cycle is a cooling stage in which the first and second valves are open for circulation of the relatively cool heat exchange water through the parallel heat exchangers of a single bank. The second stage is a transition stage from the cooling stage to the heating stage, the third valve being open to admit hot water into the heat exchangers and the second valve being held open to purge the cold water from the heat exchangers. The third stage is the heating stage in which the third and fourth valves are open for circulation of hot water through the heat exchangers. The fourth stage provides a transition from the heating stage back to the cooling stage and for this purpose the first valve is open to admit cold water and the fourth valve is held open to purge the hot water from the heat exchangers.

The invention also conceives that the four stages may be controlled in response to temperature changes in the heat exchange water and/or pressure changes in the working liquid in the confined passages through the heat exchange zones of the heat exchangers. In the presently preferred practice of the invention, both the temperature of the heat exchange water and the pressure of the confined working liquid are detected for automatic control of the four stages of the operating cycle.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

In the drawings, which are to be regarded as merely illustrative.

DESCRIPTION OF SELECTED EMBODIMENTS OF THE INVENTION

Figure 1:
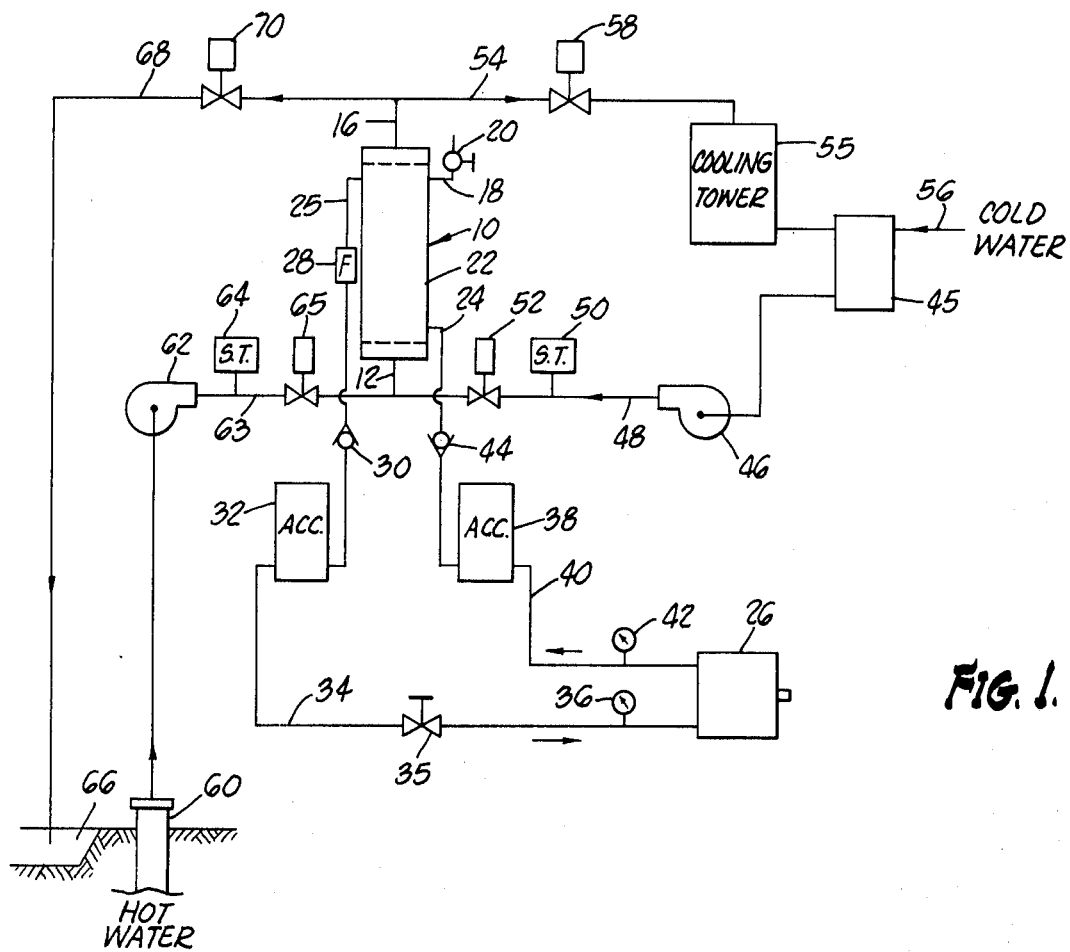
FIG. 1 is a view diagrammatically showing an embodiment of the invention that employs a single heat exchanger.
Figure 2:
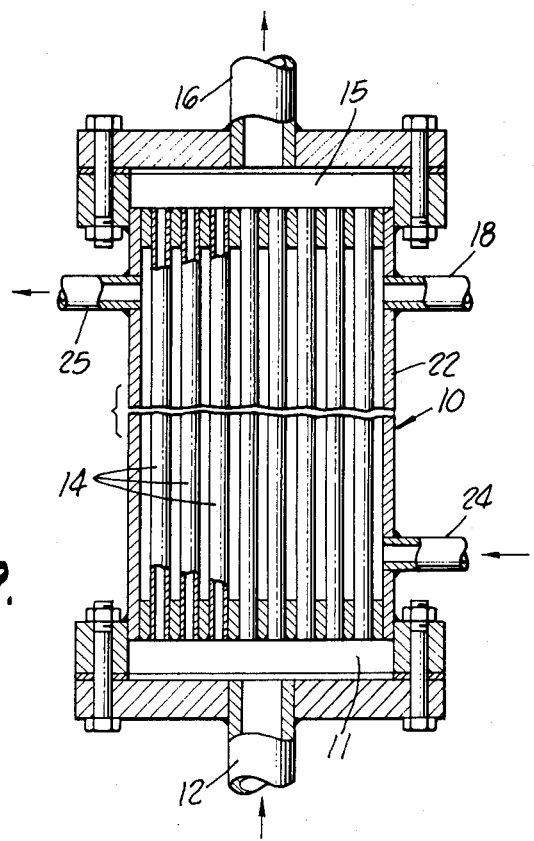
FIG. 2 is a sectional view of the heat exchanger in FIG. 1.

Referring to FIGS. 1 and 2 which illustrate a first embodiment of the invention, a heat exchanger, generally designated 10, may be of a construction such as shown in FIG. 2. The heat exchanger has an inlet header 11 in communication with an inlet pipe 12 for heat exchange liquid, and the inlet header is connected by a plurality of heat exchange tubes 14 with an outlet header 15 having communication with an outlet pipe 16 for the heat exchange liquid. By means of the two pipes 12 and 16, hot and cold heat exchange water is alternately circulated through the heat exchange tubes 14.

A fill pipe 18 provided with a manually operable valve 20 is used to replenish, when necessary, the working liquid of the heat exchanger 10 circulated over the tubes 14 within a tank portion 22. The working liquid enters the tank 22 through an intake pipe 24 and leaves the tank by an output pipe 25. Thus, the heat exchange tubes 14 constitute a heat exchange zone, and the space inside the tank 22 surrounding the heat exchange tubes constitutes a confined passage for the flow of working liquid through the heat exchange zone.

In this particular example of the invention, the working liquid drives a hydraulic motor 26 with the working liquid circulating through a closed circuit in which the outlet port of the hydraulic motor is connected to the intake pipe 24 of the heat exchanger, and the output pipe 25 of the heat exchanger is connected to the inlet port of the hydraulic motor. The output pipe 25 of the heat exchanger is connected through a suitable filter 28 and a check valve 30 to a high pressure output accumulator 32. The accumulator 32 is in turn connected to the inlet port of the hydraulic motor 26 by a pipe 34 containing a suitable regulator valve 35 and a connection with a high pressure gauge 36. The outlet port of the hydraulic motor 26 is connected to a low pressure accumulator 38 by a pipe 40 having a connection with a low pressure gauge 42. The low pressure accumulator 38 connects with the intake pipe 24 of the heat exchanger, the intake pipe being provided with a check valve 44.

Cold heat exchange water from any suitable source may be supplied to the inlet pipe 12 of the heat exchanger. In the illustrated embodiment, cold water is delivered from a storage tank 45 by a centrifugal pump 46 or other suitable means connected by a pipe 48 to the inlet pipe 12. The pipe 48 may be connected with a surge tank 50, and flow through the pipe to the heat exchanger is controlled by a normally closed solenoid valve 52 which functions as a cold water inlet valve. The cold water outlet pipe 16 of the heat exchanger is connected by a pipe 54 to a cooling tower 55 which in turn is connected to the storage tank 45. When necessary, water in the storage tank 45 is replenished through a supply pipe 56. The return pipe 54 for the cold water is controlled by a normally closed solenoid valve 58 which functions as a cold water output valve.

Hot water from a suitable source, such as a hot water well 60, is delivered by a centrifugal pump 62 or other suitable means connected by a pipe 63 to the inlet pipe 12 of the heat exchanger. The pipe 63 may be connected with a surge tank 64, and flow through the pipe to the heat exchanger is controlled by a normally closed solenoid valve 65 which functions as a hot water inlet valve for the heat exchanger.

Hot water from the outlet pipe 16 of the heat exchanger may be delivered, for example, to a pond 66 through a discharge pipe 68 containing a normally closed solenoid valve 70 which functions as a hot water outlet valve for the heat exchanger.

The low pressure accumulator 38 may be of a well known type comprising a pressure vessel charged with nitrogen, and the high pressure output accumulator 32 may be of a similar construction. The working liquid that flows through the two accumulators has a relatively high coefficient of thermal expansion and may be selected from a variety of known liquids including refrigerants, kerosene, alcohol, etc. The working liquid, of course, is not heated avove its boiling point.

An operating cycle, as hereinafter described, may be readily understood by reference to the foregoing description. What may be termed a cooling first stage, for circulating cold water through the heat exchanger tank 22, is carried out by placing both the cold water intake valve 52 and the cold water output valve 58 in their open positions to enable circulation of the cold water in a closed circuit. A second stage comprises a transition from the cooling stage to a heating third stage. For this purpose, the cold water intake valve 52 is closed and the hot water inlet valve 65 is opened to admit hot water into the heat exchanger tank 22. The cold water outlet valve 58 is retained in open position for a period sufficient to purge the tank 22 of cold water, whereupon the cold water outlet valve 58 is closed and the hot water outlet valve 70 opened to enable circulation of hot water through the heat exchanger tank. To make the transition from the heating third stage back to the cooling first stage, the hot water inlet valve 65 is closed and the cold water inlet valve 52 is opened to admit cold water into the heat exchanger tank 22. The hot water outlet valve 70 is retained in open position for a period sufficient to purge the tank 22 of hot water, whereupon the hot water outlet valve 70 is closed and the cold water outlet valve 58 opened to enable circulation of cold water through the heat exchanger tank.

When the working liquid in the heat exchanger tank 22 is expanded in volume, due to the circulation of hot water through the heat exchanger tubes 14, an incremental surge of water is forced past the check valve 30 into the accumulator tank 32; and when the working liquid in the tank 22 is subsequently contracted in volume, due to the circulation of cold water through the tubes 14, a new increment of working liquid is drawn into the tank 22 of the heat exchanger from the accumulator 38, reverse flow of the working liquid being prevented by the two check valves 30 and 44.

The four normally closed solenoid valves 52, 58, 65, and 70 may be operated sequentially by automatic timer means. Preferably, however, the operating cycle is controlled both in response to changes in temperature of the outlet water through pipe 16 and changes in pressure in the tank 22 of the heat exchanger, as will be explained with reference to the second embodiment of the invention illustrated by FIGS. 3 and 4.

Figure 3:
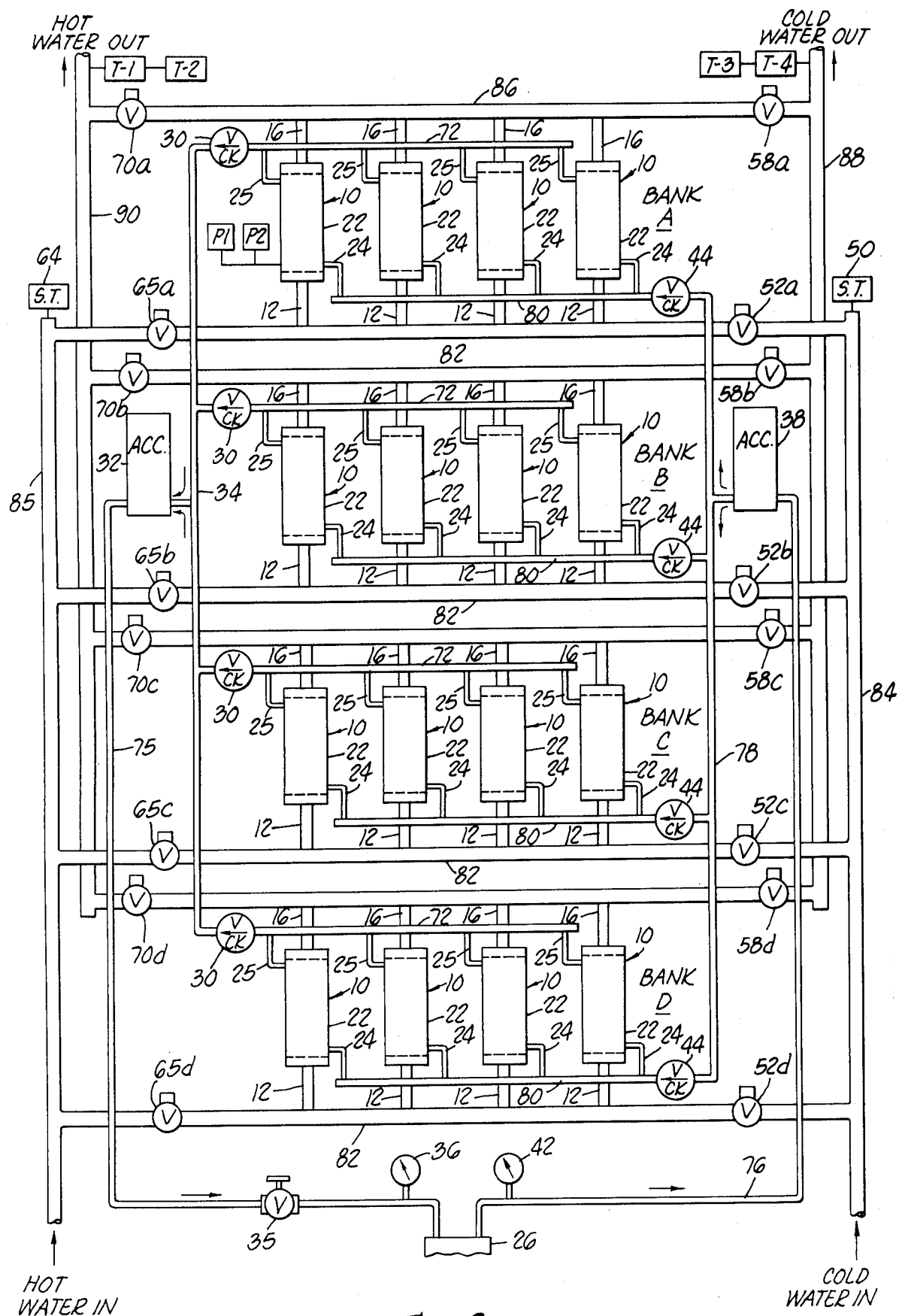
FIG. 3 is a view diagrammatically showing the fluid connections of a four-bank arrangement of parallel connected heat exchangers as embodied in a complete hydraulic fluid generator unit.

FIG. 3 is a view diagrammatically showing, by way of example, how four banks A, B, C, and D of the heat exchangers 10 may be employed to provide a substantially constant hydraulic input into a hydraulic notor 26. In this example, each back comprises four heat exchangers 10 connected in parallel.

Each heat exchanger 10 in a bank has the usual intake pipe 24 and output pipe 25 for flow of the working liquid through the heat exchanger. The output pipes 25 of the heat exchangers of each bank are connected to a common output manifold 72, the outlet end of which is provided with a check valve 30. The four check valves 30 are connected by a pipe 34 to a high pressure accumulator 32 which in turn is connected to the input port of the hydraulic motor 26 by a pipe 75. The pipe 75 is provided with a regulator valve 35 and is connected to a high pressure gauge 36. The outlet port of the hydraulic motor 26 is connected by a pipe 76 to a low pressure accumulator 38 and the accumulator is connected in turn to a pipe 78. The four intake pipes 24 of the heat exchangers of each bank are connected to a common intake manifold 80, and the pipe 78 from the low pressure accumulator 38 is connected to each intake manifold 80 through a check valve 44.

Turning now to the circulation of hot and cold heat exchange water through the heat exchangers, the inlet pipes 12 of the heat exchangers in each bank are connected to a common manifold 82 having one end connected to a cold water supply pipe 84 through a correspondingly normally closed solenoid valve 52a (bank A) which functions as a cold water intake valve. The other end of each inlet manifold 82 is connected to a hot water supply pipe 85 through a corresponding normally closed solenoid valve 65a (bank A) which serves as the hot water intake valve for the bank of heat exchangers. Preferably, the cold water supply pipe 84 is provided with a surge tank 50 and the hot water supply pipe 85 is provided with a surge tank 64.

The outlet pipes 16 for the outflow of hot and cold heat exchange water from the four heat exchangers of each bank are connected to a common outflow manifold 86 having one end connected to a cold water return pipe 88 through a corresponding normally closed solenoid valve 58a (bank A) which functions as a cold water outlet valve. The other end of each outflow manifold 86 is connected to a hot water return pipe 90 through a corresponding normally closed solenoid valve 70a (bank A) which functions as a hot water outlet valve.

It is apparent that each of the banks A, B, C, and D of heat exchangers will have a similar four-stage operating cycle. With reference to bank A, this operating cycle may be described as having a cooling first stage which may be carried out to cool the working liquid by opening the corresponding cold water intake valve 52a and the corresponding cold water outlet valve 58a. A second transition stage from the cooling stage to a heating third stage may be then carried out by closing the cold water intake valve 52a and opening the hot water inlet valve 65a. The cold water outlet valve 58a is left open long enough to purge the cold water out of the bank of heat exchangers, then the cold water outlet valve 58a is closed and the hot water outlet valve 70a is opened to carry out the heating third stage in which hot water flows through the heat exchangers. A fourth transition stage from the heating stage to the cooling stage is carried out by first closing the hot water inlet valve 65a and opening the cold water inlet valve 52a.

After a period of time to permit the hot water to be purged from the heat exchangers through the hot water outlet valve 70a, the hot water outlet valve 70a is closed and the cold water outlet valve 58a is opened to carry out the cooling stage of the operating cycle.

Figure 4:
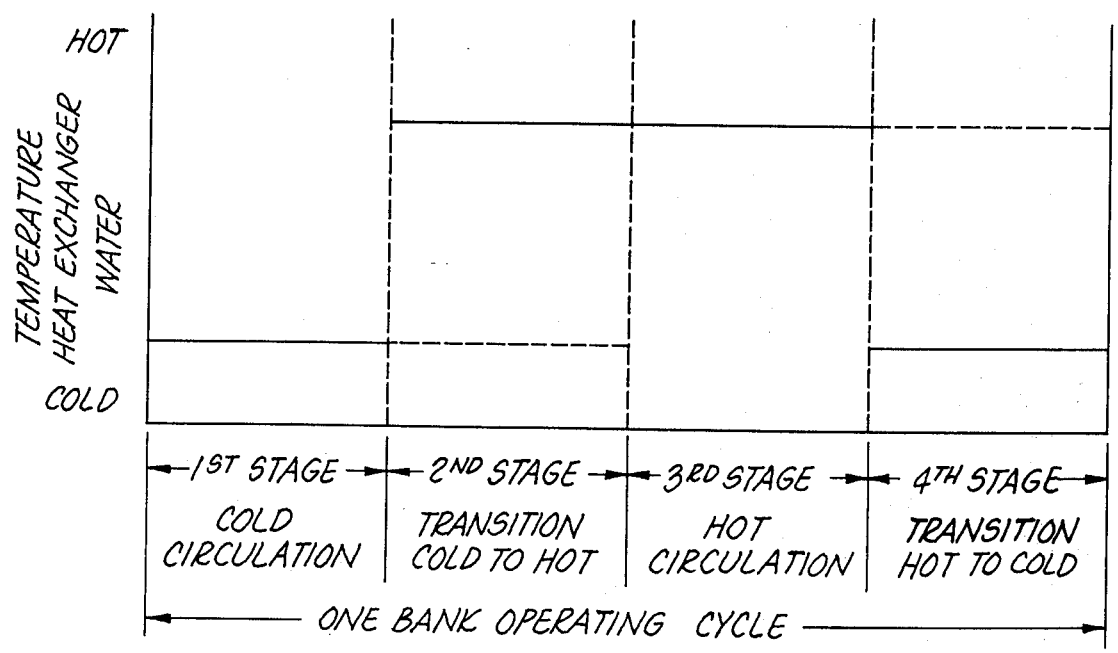
FIG. 4 is a view graphically showing the sequence of operation of four control valves to carry out the four-stage operating cycle of a single bank of heat exchangers.

A typical operating cycle of a bank of the heat exchangers 10 is shown graphically in FIG. 4, which indicates that the four stages of the operating cycle are of equal time duration, but in fact the four stages are unequal. The whole operating cycle may be carried out in less than half a minute.

Figure 5:
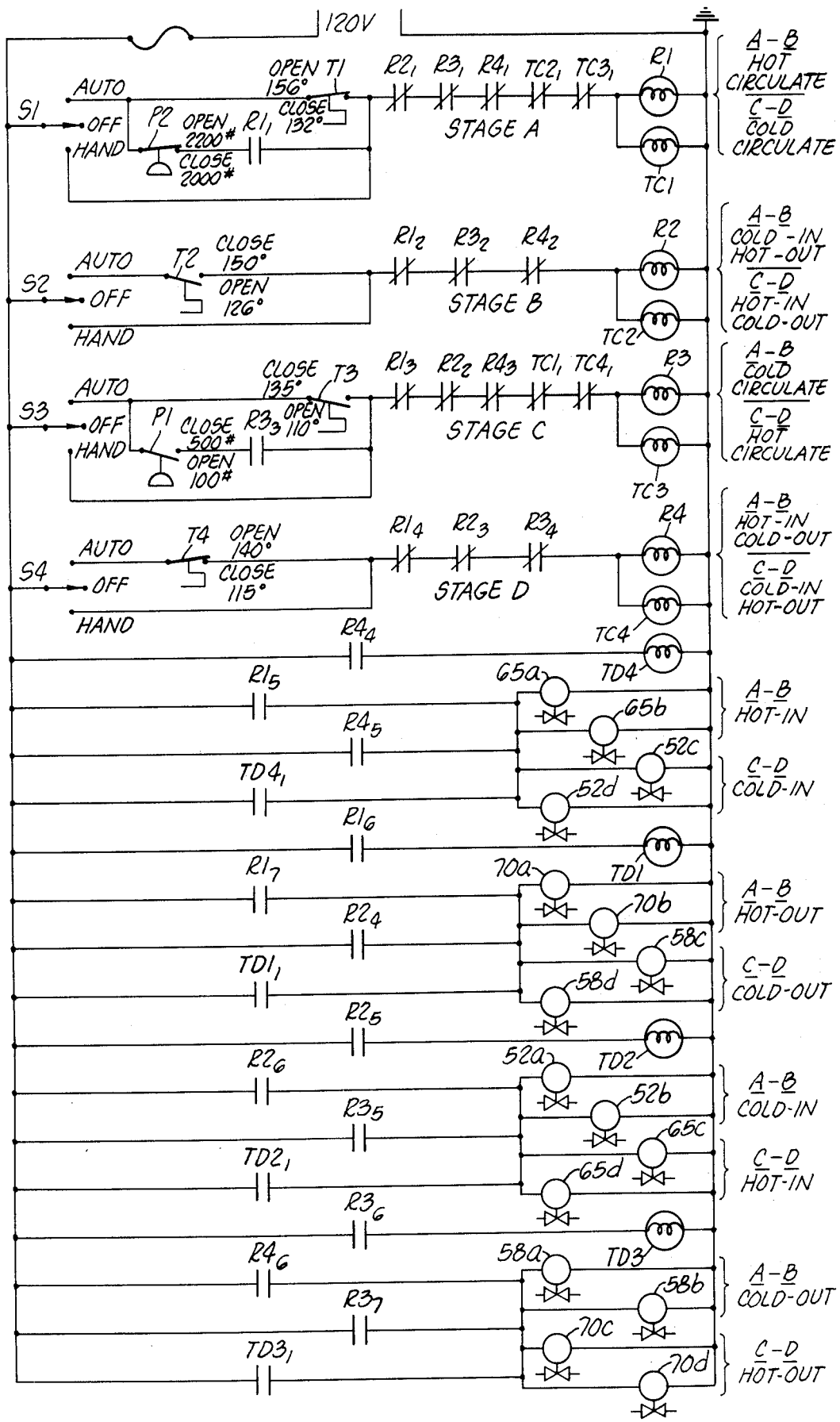
FIG. 5 is a diagram of electric circuitry to sequentially control the respective operating cycles of the four banks of heat exchangers as shown in FIG. 3.

FIG. 5 is a schematic circuit diagram of the control for the four banks A, B, C, and D of heat exchangers as shown in FIG. 3. The electrical control also carries out the four stages of the operating cycle sequentially in each bank in response to temperature changes at the hot water end of the outflow manifold as detected by thermostatic switches T1 and T2, and in response to temperature changes at the cold water end of the outflow manifold as detected by thermostatic switches T3 and T4 as well as pressure changes in the working liquid inside one of the heat exchangers 10 as detected by the pressure-responsive switches P1 and P2.

For example, in bank A, the first stage in the operating cycle shown in FIG. 4 is carried out by relay R3 in FIG. 5; the second stage of the operating cycle is carried out by relay R4; the third stage is carried out by relay R1; and the fourth stage is carried out by relay R2. Each of the four relays has normally closed contacts that make the other three relays inoperative, when it is operated. Thus, when relay R3 is energized to carry out the first stage of the operating cycle, contacts $R3_4$ are open to make relay R4 inoperative; contacts $R3_1$ are open to make relay R1 inoperative; and contacts $R3_2$ are open to make relay R2 inoperative. When relay R4 is energized, contacts $R4_1$ are open to prevent energization of relay R1; contacts $R4_2$ are open to keep relay R2 inoperative; and contacts $R4_3$ are open to keep relay R3 inoperative. When relay R1 is energized, contacts $R1_2$ are open to prevent operation of relay R2; contacts $R1_3$ are open to prevent energization of relay R3; and contacts $R1_4$ are open to prevent operation of relay R4. When relay R2 is energized, contacts $R2_2$ are open to prevent energization of relay R3; contacts $R2_3$ are open to prevent energization of relay R4; and contacts $R2_1$ are open to prevent energization of relay R1.

Associated with the relays R1, R2, R3, and R4 are switches S1, S2, S3, and S4, respectively, which switches are single-pole three-position switches. Each of the four switches may be turned to a position for manual control of the corresponding relay or may be turned to position for automatic control of the relay. During normal operation of the system all of the switches S1-S4 are at their automatic positions to cause the four stages of the operating cycle to follow each other automatically through any number of operating cycles. The manner in which the four stages of the operating cycle are carried out sequentially in response to temperature and pressure changes will now be described.

Assuming that 180° F. hot water and 80° F. cold water are available, and that all switches, contacts, pressure switches, and thermostat contacts are in the positions as shown in FIG. 5, the unit is started up by placing switch S3 in its "hand" operation position. Relay R3 will now be energized and operate to initiate the cooling first stage of the operating cycle, contacts $R3_5$ closing to energize and open the cold water inlet valves 52a, 52b of banks A and B, and the hot water inlet valves 65c, 65d of banks C and D. Contacts $R3_6$ also close to energize time delay opening relay TD3 which closes its contacts $TD3_1$ in parallel with closed relay contacts $R3_7$ which energizes and opens the cold water outlet valves 58a, 58b of banks A and B, and the hot water outlet valves 70c, 70d of banks C and D.

Simultaneously with the energization of relay R3, the instant opening time delay closing relay TC3 is operated to open its contacts TC3₁ to prevent the energization of relay R1, in the event that the contacts of thermostatic switch T1 should be closed.

When the temperature of cold water outflow is below 110° F. and the pressure of the working liquid in bank A is below 100 psi as measured by suitable gauges (not shown), the relay control switches are shifted to their "auto" operation positions successively in the sequence S4, S1, S2 and S3.

The transition stages for changing banks A, B from the cooling stage to the heating stage, and the banks C, D from the heating stage to the cooling stage, will now automatically be simultaneously carried out. The thermostatic switch T3 on the cold water end of the outflow manifold 86 is arranged to open when the temperature drops to 110° F. and close when the temperature rises to 135° F., and the pressure switch P1 is arranged to close at 500 psi and open at 100 psi. Thus, since the temperature at T3 is below 110° F. and the pressure sensed by the pressure responsive switch P1 is below 100 psi, as a result of the starting up cooling stage operation, both T3 and P1 will have their contacts in open position. As a consequence, when switch S3 is changed to its "auto" position, relay R3 and the time delay closing relay TC3 will be deenergized. Contacts R3₅ open to deenergize and close the cold water inlet valves 52a, 52b of banks A and B, and the hot water inlet valves 65c, 65d of banks C and D. Contacts R3₆ also open to deenergize time delay opening relay TD3 which delays the opening of its contacts TD3₁ which are in parallel with the now open contacts R3₇ and R4₆. Thus, the cold water outlet valves of banks A and B and the hot water outlet valves of banks C and D are maintained open for a period which will permit the cold and hot heat exchanger water respectively in banks A and B and C and D to be purged from the heat exchangers. At the same time that the contacts R3₅ and R3₆ are closed, contacts R3₄ in the control circuit of relay R4 are opened. This control circuit contains thermostatic switch T4 on the cold water end of the outflow manifold 86. This switch is arranged to open at 140° F. and close at 115° F. This switch will therefore be in a closed position during the cold water circulating stage in the heat exchangers of banks A and B. Consequently, when contacts R3₄ are closed, as previously stated, relay R4 will be energized to close its contacts R4₆ to establish an energizing circuit for keeping the outlet valves 58a, 58b, 70c and 70d in open position after time delay contacts TD3₁ open. At the same time, contacts R4₅ close to energize and open the hot water inlet valves 65a, 65b of banks A and B, and the cold water inlet valves 52c, 52d of banks C and D to carry out the purging operations. Closure of contacts R4₄ energizes time delay opening relay TD4 which will now close its contacts TD4₁, in parallel with open contacts R1₅ and closed contacts R4₅. Purging of the cold water in the heat exchangers of banks A and B, and the hot water in the heat exchangers of banks C and D will continue until the temperature at the thermostatic switch T4 reaches 140° F. At this temperature relay R4 will be deenergized and open its contacts R4₄, R4₅ and R4₆. Contacts R4₆ deenergize the outlet valves 58a, 58b, 70c and 70d while, however, contacts TD4₁ will have a delayed opening and maintain the valves 65a, 65b, 52c and 52d in open position for a sufficient time to enable the closure of contacts R4₁ to energize relay R1 and the closure of its contacts R1₅ so as to continue the energization of the valves 65a, 65b, 52c and 52d and keep them open after the time delay opening contacts TD4₁ have opened.

As shown in FIG. 3, a thermostatic switch T1 at the hot water end of the outflow manifold 86 is arranged to open when the temperature rises to 156° F. and close when the temperature drops to 132° F. A similarly located thermostatic switch T2 is arranged to close when the temperature rises to 150° F. and open when the temperature drops to 126° F., and pressure switch P2 at one of the heat exchangers in bank A to sense pressure of the working liquid is arranged to open at 2200 psi and close at 2000 psi.

Thermostatic switch T1 and pressure switch P2 are connected in parallel in the "auto" control circuit of relay R1. At the beginning of the hot water circulating stage in the heat exchangers of bank A, the thermostatic switch T1 will be closed with the temperature rising, and the pressure switch P2 will be closed with the pressure of the working fluid increasing. Relay R1 will remain in its energized condition until both the temperature at the thermostatic switch T1 rises to 156° F. and the pressure at the pressure switch P2 rises to 2200 psi.

Upon deenergization of relay R1, the next transition stages will be initiated to change banks A, B from the heating stage to the cooling stage, and the banks C, D from the cooling stage to the heating stage. Time delay closing relay TC1 is also deenergized, but keeps its contacts TC1₁ open to prevent operation of relay R3, the thermostatic switch T3 being closed. Contacts R1₅ now open to deenergize inlet valves 65a, 65b, 52c, and 52d to terminate the supply of hot water to the banks A and B, and the supply of cold water to banks C and D. At the same time contacts R1₆ open to deenergize time delay opening relay TD1, its contacts TD1₁ remaining closed to temporarily keep open the hot water outlet valves 70a, 70b of banks A and B, and the cold water outlet valves 58c, 58d of banks C and D. Concurrently, contacts R1₂ of opened relay R1 operate to energize relay R2 through thermostatic switch T2 which is closed. Relay contacts R2₄ close to maintain the outlet valves open after contacts TD1₁ open. Contacts R2₅ energize time delay relay coil TD2 which closes contacts TD2₁ to energize and open cold water inlet valve 52a, 52b of banks A and B, and hot water inlet valves 65c, 65d of banks B and C. Contacts R2₆ also close to maintain the energization of the cold and hot inlet valves open after contacts TD2₁ open, and for a period which will permit the hot and cold heat exchanger water, respectively in banks A and B and C and D, to be purged from the heat exchangers. When the hot water is purged from the heat exchangers by the flow of cold water from the inlet valves 52a, 52b, the cold water will actuate thermostatic switch T2 and deenergize relay R2 and the time delay close relay TC2. Contacts R2₄ open and deenergize hot water outlet valves 70a, 70b of banks A and B, and cold water outlet valves 58c, 58d of banks C and D. Contacts R2₅ open to deenergize time delay open relay TD2, and its contacts TD2₁ remain closed to retain valves 52a, 52b, 65c and 65d in open position. Time delay close relay TC2 opens contacts TC2₁ to prevent operation of relay R1, thermostatic switch T1 being closed. Deenergization of relay R2 closes contacts R2₂ which operate to energize relay R3 through thermostatic switch T3 and pressure switch P1. Relay R3 then functions in a manner similar to that described during the hand starting operation and operates to open the cold water inlet valves 52a, 52b of banks A and B, and the hot water inlet valves 65c, 65d of banks C and D. The operation continues automatically to open the cold water outlet valves 58a, 58b of banks A and B, and the hot water outlet valves 70c, 70d of banks C and D, as previously described. These operations continue until both the temperature at thermostatic switch T3 drops below 110° F. and the pressure at pressure switch P1 drops below 100 psi, whereupon relay R3 will be deenergized and the automatic sequence of operations cyclically continued in the manner previously described.

From the foregoing description and drawings, it will be clearly evident that the delineated objects and features of the invention will be accomplished.

Various modifications may suggest themselves to those skilled in the art without departing from the spirit of the disclosed invention, and hence, it is desired not to restrict it to the specific form shown or uses mentioned, except to the extent indicated in the appended claims.

What is claimed is:

1. In a hydraulic fluid generator for utilizing the heat energy of a source of relatively warm water to produce a high pressure hydraulic output, the combination of:
   a working liquid having a relatively high coefficient of thermal expansion;
   a heat exchanger providing a heat exchange zone;
   passage means for the working liquid through the heat exchanger and through the heat exchange zone therein;
   means to circulate a relatively cold fluid through the heat exchanger to cool the working liquid in said passage means with consequent contraction of the volume of the working liquid in the passage means;
   alternate means to circulate the relatively warm liquid from said source through the heat exchange zone for heating the working liquid in said passage means with consequent expansion in volume of the working liquid; and
   means to prevent reverse flow of the working liquid through the passage means, thereby to cause the alternate contraction and expansion of the working liquid to create a high pressure hydraulic output of the working liquid from the passage means.

2. A combination as set forth in claim 1 which includes means to utilize said hydraulic output;
   and which includes conduit means for recirculation of the working liquid from said utilizing means through the heat exchange zone.

3. A combination as set forth in claim 2 which includes means in said conduit means to reduce fluctuations in pressure in the working liquid that is returned to the heat exchange zone.

4. A combination as set forth in claim 1 which includes means on the output side of said passage means through the heat exchange zone to reduce fluctuations in the pressure of the working liquid.

5. A combination as set forth in claim 4 in which said means to reduce fluctuations comprises accumulator means.

6. A combination as set forth in claim 1 in which said means to prevent reverse flow of the working liquid comprises check valve means on the inlet end of said passage means and check valve means on the output end of the passage means.

7. A combination as set forth in claim 1 which includes first conduit means from the output side of said passage means to the input of a fluid motor; which includes second conduit means connecting the outlet of the fluid motor to the inlet end of said passage means of the heat exchanger;
   and which includes means in said first conduit means to reduce fluctuations in pressure of the working liquid.

8. A combination as set forth in claim 7 which includes means in said second conduit means to reduce fluctuations in pressure of the working liquid.

9. A combination as set forth in claim 8 in which both of said pressure reducing means are accumulators.

10. A combination as set forth in claim 1 which includes:
    a first normally closed valve to control flow of the relatively cool fluid into the heat exchange zone;
    a second normally closed valve to control the discharge of the relatively cool fluid from the heat exchange zone;
    a third normally closed valve to control the entry of the relatively warm water into the heat exchange zone;
    a fourth normally closed valve to control the discharge of the relatively warm water from the heat exchange zone; and
    control means to operate said first, second, third and fourth valves to create an operating cycle comprising a cooling stage, a stage for transition from the cooling stage to a heating stage, a heating stage, and a stage for transition from the heating stage to the cooling stage.

11. A combination as set forth in claim 10 in which the first and second valves are open for the cooling stage and the third and fourth valves are open for the heating stage.

12. A combination as set forth in claim 10 in which the first and fourth valves are open for the transition stage from the heating stage to the cooling stage;
    and in which the second and third valves are open for the transition from the cooling stage to the heating stage.

13. A combination as set forth in claim 12 in which means to control termination of the heating stage includes thermostat means to sense rise in temperature of the fluid flowing through the fourth valve.

14. A combination as set forth in claim 10 in which means to control the termination of the heating stage includes means to sense rise in pressure of the working liquid in said passage means.

15. A combination as set forth in claim 12 which includes means to terminate the heating stage both in response to the rise of the temperature of the fluid flowing through the fourth valve and the rise in pressure of the working liquid in said passage means in the heat exchanger.

16. A combination as set forth in claim 10 which includes means to control termination of the cooling stage in response to drop in the temperature of the fluid flowing through the second valve.

17. A combination as set forth in claim 11 which includes means to control the termination of the cooling stage of the operating cycle in response to drop in the pressure of the working liquid in said passage means through the heat exchanger zone.

18. A combination as set forth in claim 11 which includes means to control the termination of the cooling stage in response both to the drop in temperature of the fluid flowing through the second valve and drop of pressure in the working liquid in said passage means through the heat exchanger zone.

19. A combination as set forth in claim 12 which includes means to terminate the transition stage from the cooling stage to the heating stage, said terminating means being responsive to rise in temperature of the fluid flowing through said second valve.

20. A combination as set forth in claim 12 which includes means to terminate the transition stage from the heating stage to the cooling stage, said terminating means being responsive to drop in temperature of fluid flowing through the fourth valve.

21. A combination as set forth in claim 12 which includes:
   a first electrical relay to control the heating stage;
   a second electrical relay to control the transition stage from the heating stage to the cooling stage of the operating cycle;
   a third electrical relay to control the cooling stage;
   a fourth electrical relay to control the transition stage from the cooling stage to the heating stage,
   said relays being responsive to changes in temperature of the heat exchange fluid that is discharged from the heat exchanger.

22. A combination as set forth in claim 21 in which each of said four relays includes normally closed contacts operable to prevent energization of the other three of the relays.

23. A combination as set forth in claim 22 in which each of said relays in the sequence of relays has normally closed contacts in the energizing circuit of the next successive relay.

24. A combination as set forth in claim 1 which includes a discharge passage to receive the heat exchange fluid from the heat exchanger,
   said discharge passage having a first end to discharge relatively cool heat exchange fluid and having a second opposite end to discharge relatively hot heat exchange fluid;
   a first outlet valve at the first end of said discharge passage;
   a second outlet valve at the second end of said discharge passage; and
   means to control the flow of the heat exchange fluid through the heat exchanger in response to temperature changes of the fluid in said discharge passage.

25. A combination as set forth in claim 24 which includes means to terminate the flow of cool heat exchange fluid through the heat exchanger,
   said terminating means including means responsive to changes in temperature of the fluid in said discharge passage at the first end of the discharge passage.

26. A combination as set forth in claim 24 which includes means to terminate the flow of hot heat exchange fluid through the heat exchanger in response to changes of the pressure of the working liquid in said passage means through the heat exchange zone.

27. A combination as set forth in claim 24 which includes means to terminate the flow of cool heat exchange fluid through the heat exchanger,
   said terminating means being responsive to changes in temperature in said discharge passage at the second end of the discharge passage.

28. A combination as set forth in claim 24 which includes means to terminate the flow of cool heat exchange fluid through the heat exchanger,
   said terminating means including means responsive to changes in pressure in the working liquid in said passage through the heat exchange zone.

29. A combination as set forth in claim 28 in which said terminating means is also responsive to changes in temperature of the fluid in said discharge passage at said second end of the discharge passage.

30. The method for utilization of thermal energy from a fluid comprising:
   pumping fluid containing thermal energy into a container having a heat exchanger therein with a working fluid which flows into and out of said heat exchanger and in an isolated part of the heat exchanger;
   discontinuing the flow of fluid containing thermal energy to said container and pumping a second fluid having a different amount of thermal energy to the same container;
   causing the working fluid to be introduced into a hydraulic motor;
   causing said hydraulic motor to operate by reason of the introduction of the working fluid therein; and
   utilizing the operation of said hydraulic motor to provide mechanical energy.

31. The method of claim 30 wherein a series of containers are alternately subjected to the alternate flow of fluids containing different degrees of thermal energy and wherein the working fluid is connected between each of the different containers by means of heat exchangers within each container.

32. An apparatus for converting thermal energy to mechanical energy comprising
   a container for fluid having an inlet and an outlet;
   means connected to the inlet to provide alternately a first fluid having one degree of thermal energy and a second fluid having a second degree of thermal energy;
   means connected to the outlet to discharge alternately the fluid contained in the first degree of thermal energy and the fluid having the second degree of thermal energy;
   heat exchange means containing a working fluid contained within said container;
   means connecting with said heat exchange means to supply said working fluid into said heat exchange means;
   means connected to said heat exchange unit to exhaust said working fluid out of said heat exchange means;
   means connected to said exhaust means to transfer said exhausted fluid to a mechanical device; and
   means connected to said mechanical device to remove said working fluid when the same has been utilized.

33. The apparatus of claim 32 wherein the means to utilize said working fluid is a hydraulic motor.

34. The apparatus of claim 33 wherein a plurality of containers is provided each of which has a heat exchange unit and in which all heat exchange units are interconnected to a common source and exhaust of working fluid.

* * * * *